United States Patent

[11] 3,588,860

| [72] | Inventor | Louis C. Hayward, Jr.<br>6116 E 58th St., Tulsa, Okla. 74135 |
|---|---|---|
| [21] | Appl. No. | 788,280 |
| [22] | Filed | Dec. 31, 1968 |
| [45] | Patented | June 28, 1971 |

[54] LONG DISTANCE VISUAL MONITOR OF ELECTRICAL CURRENT OR VOLTAGE INPUT TO AN ELECTRICAL LOAD CONDITION
4 Claims, 4 Drawing Figs.

| [52] | U.S. Cl. | 340/248, 324/70 |
|---|---|---|
| [51] | Int. Cl. | G08b 21/00 |
| [50] | Field of Search | 340/253 (A), 248; 324/70 (D), 70 (F), (Inquired), 65 |

[56] References Cited
UNITED STATES PATENTS

| 2,950,420 | 8/1960 | Hastings et al. | 324/70X |
|---|---|---|---|
| 3,177,480 | 4/1965 | Sankey | 340/253 |
| 3,375,510 | 3/1968 | Pitches | 340/253 |

Primary Examiner—John W. Caldwell
Assistant Examiner—Daniel Myer
Attorney—Head and Johnson ABSTRACT: Unattended electrical facilities such as ground, earth, water or surface equipment, e.g., pipeline cathodic protection systems, are provided with an indicator sufficiently visible for airplane patrol inspection. The visual indicator is tied into equipment and is a monitoring device operating as a function of electrical power load and indicates changes in either voltage, amperage or wattage of the facility.

PATENTED JUN28 1971

INVENTOR.
LOUIS C. HAYWARD, JR

BY

Head & Johnson
ATTORNEYS

INVENTOR.
LOUIS C. HAYWARD, JR

BY

*Head & Johnson*
ATTORNEYS

INVENTOR.
LOUIS C. HAYWARD, JR

BY

*Head & Johnson*
ATTORNEYS

3,588,860

LONG DISTANCE VISUAL MONITOR OF ELECTRICAL CURRENT OR VOLTAGE INPUT TO AN ELECTRICAL LOAD CONDITION

BACKGROUND OF THE INVENTION

This invention relates to electrical communication systems or various other types of substantially constant power consumption electrical loads in which the apparatus is responsive to a given condition. More particularly, the invention relates to the aerial pipeline inspection of cathodic protection rectifiers.

Pipelines carrying fluids such as oil, gas, water, and the like, are subject to corrosion caused in part by electrolytic action set up between the ground or the material in which the pipeline is placed and the pipeline itself. Cathodic protection rectifiers are utilized extensively on such pipelines to arrest and control such corrosion. Periodic inspection of the cathodic protection units is normally required and hence requires personnel to make the inspection. Most pipeline companies already employ air patrol units to cover pipeline right-of-ways to observe and report conditions or leakage or other irregularities that could affect normal operation. The visual inspection of cathodic protection units has been taught, heretofore, in U.S. Pat. No. 3,247,500 and No. 3,266,027. However, these systems teach on-off type indicators which in one instance must be manually reset, while the other is automatically reset. Neither, however, provide an indicated variable output within the range between preset or desired limits. In the preferred example, the device of this invention will provide visual indication within limits of a full-on and full-off as well as including the full-on and full-off positions.

SUMMARY

This invention provides a reliable method of monitoring, by aerial or other distant observation, unattended electrical circuitry of equipment and facilities such as a cathodic protection rectifier system during its normal operation and is capable of indicating variable parameters in addition to abnormal conditions. The visual monitor is a function of the direct current output without restricting or inserting resistance into the rectifier DC circuit.

The invention further provides a visual indicating means interconnected by an eddy current principle with an alternating current motor. The indicator is visible to an airplane pilot patrol sufficient to see and/or record the indicated variable output. The visual indicator is responsive to alternating current changes by an AC solid-state phase control means in the primary portion of the input electrical supply to a rectifier unit. Basically, the visual indicator operates on an eddy current principle through which a permanent rotor magnet, attached to a shaded pole motor, is varied in speed by the phase control circuit, the resultant output or torque being translated through an airgap by eddy current means which positions the indicator. The system provides means to detect any electrical power supply failures or failure of the cathodic protection installation and permits visual indication of deviations from normal, no matter how small or large, and hence gives an immediate inspection to determine whether immediate remedial correction is needed or whether on site inspection can be made at a later date when convenient.

The invention is further useful in monitoring other types of unattended electrical phenomena, either AC or DC, or signal circuitry, systems or facilities, to achieve a desired indication of characteristics and operation for observation from an airplane or other distant place.

DESCRIPTION OF THE PREFERRED EMBODIMENTS

Before explaining the present invention in detail, it is to be understood that the invention is not limited in its application to the details of construction and arrangement of parts illustrated in the accompanying drawings, since the invention is capable of other embodiments and of being practiced and carried out in various ways. Also, it is to be understood that the phraseology or terminology employed herein is for the purpose of description and not of limitation.

Figure 1:
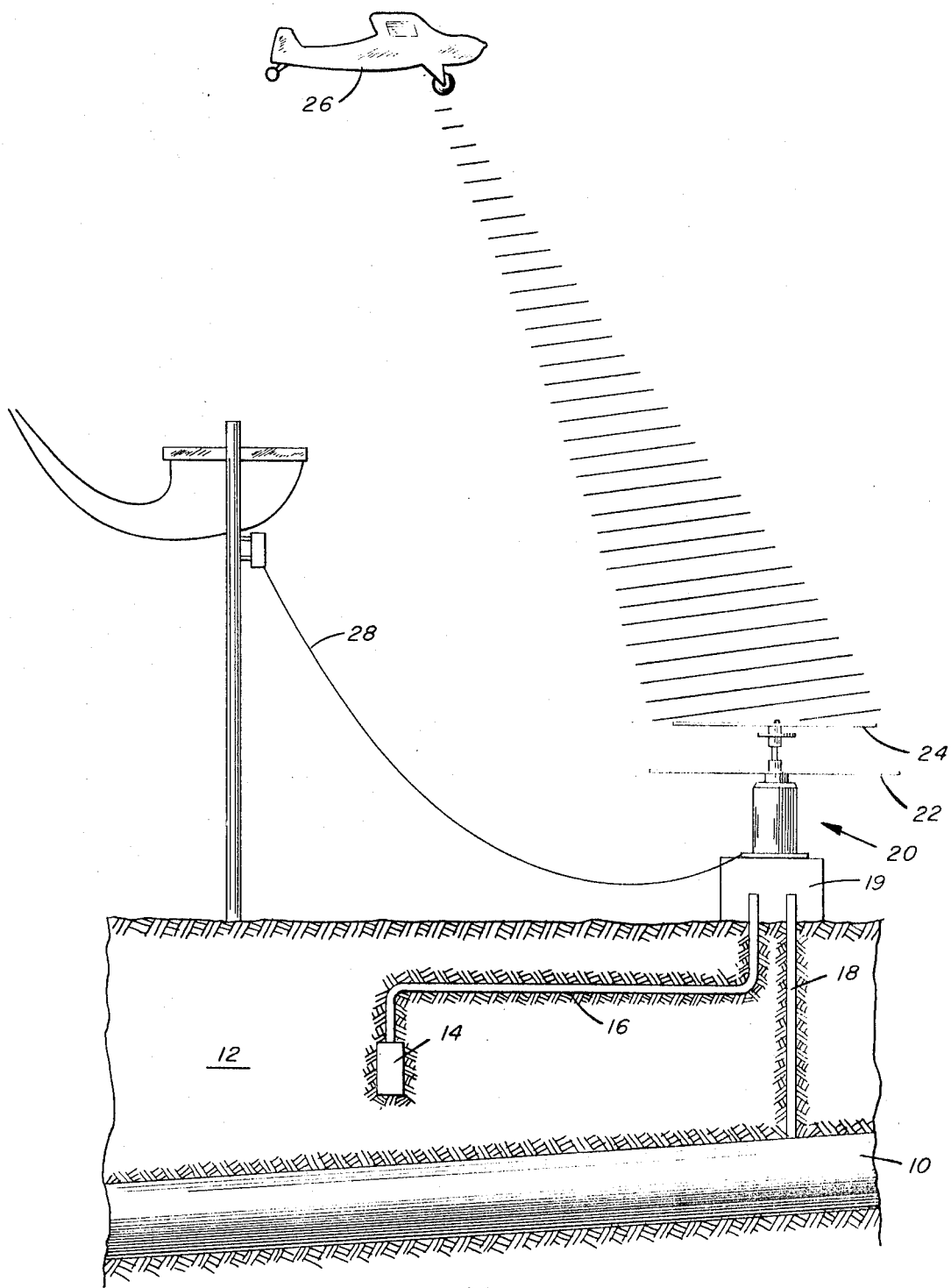
FIG. 1 is a schematic view depicting the preferred use of this invention.
Figure 4:
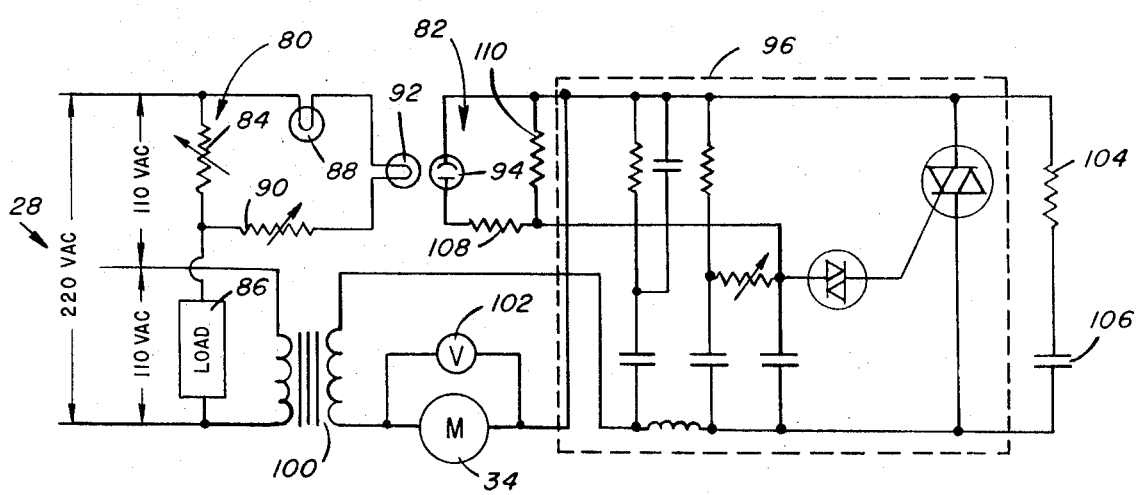
FIG. 4 is a schematic circuit diagram of the AC monitoring and AC phase control circuit unit used in the invention.

In FIG. 1 a typical useage of this invention is depicted by a pipeline cathodic protection rectifier installation wherein a pipeline 10 buried in the ground 12 is cathodically protected by way of a conventional rectifier circuit 19 (load 86 in FIG. 4) involving a rectifier ground rod or anode 14, ground 12 and pipeline 10, by way of connecting cables 16 and 18, which connect this rectifier circuit "load" 86 of FIG. 4 to power line 28 and to the control and indicator circuitry described in FIG. 4. This rectifier installation load 86 condition through the circuitry of FIG. 4 is then transmitted to the indicator unit, generally designated by the numeral 20, which includes a fixed indicator background 22 and the movable indicator 24 which is capable of being visible to a pilot in an airplane 26. Suitable input AC electrical energy used in the circuitry with this invention is supplied through electric power lines 28 to both the load 86 of rectifier unit 19 and the control circuitry of FIG. 4.

Figure 2:
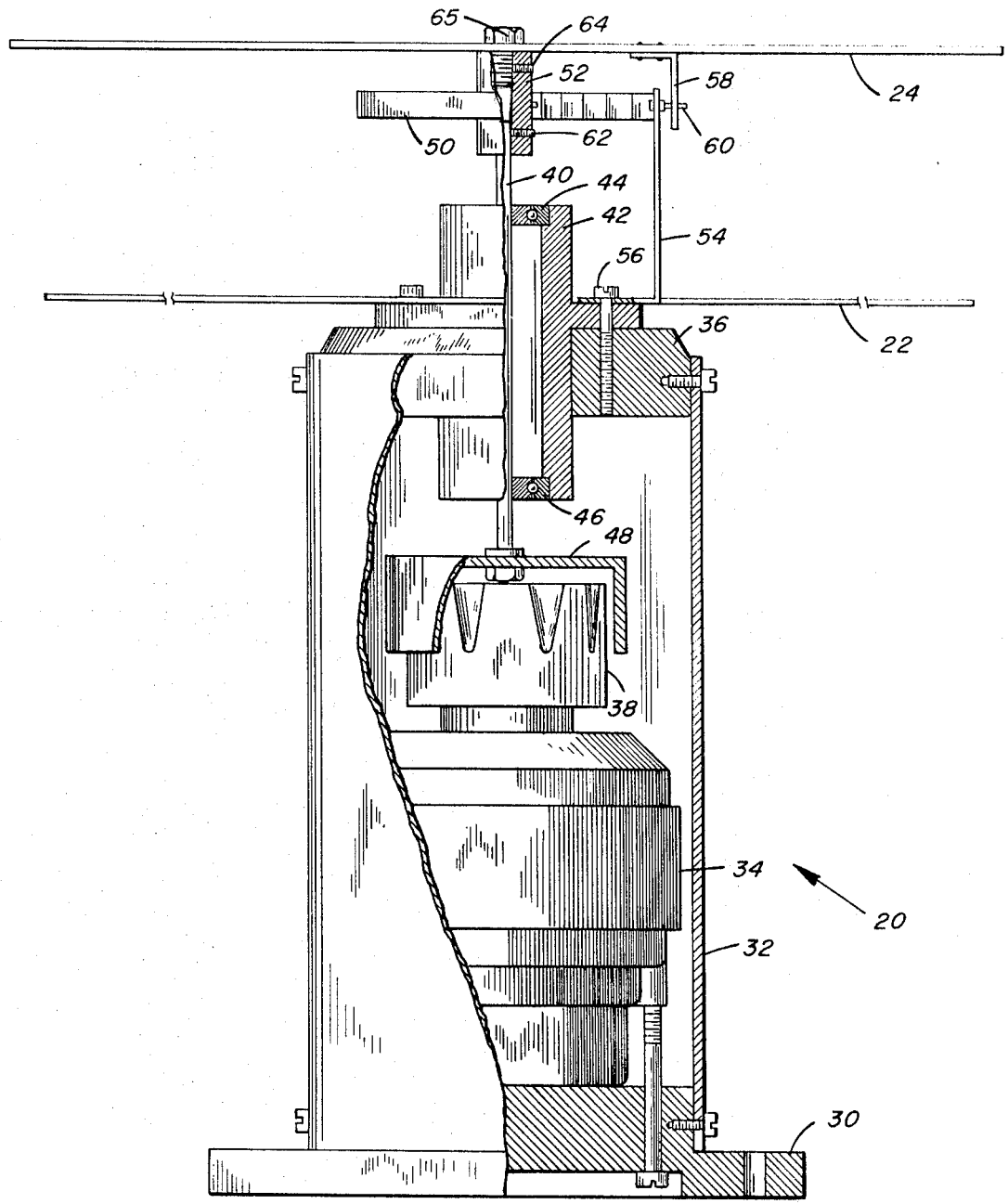
FIG. 2 is a partial sectional view of the indicator unit of this invention.

Referring now to FIG. 2, the indicator unit 20 of this invention includes a mounting base 30 to which is attached a cylindrical housing 32. A shaded pole AC motor 34, totally enclosed and of about 1550 r.p.m., is vertically mounted within the housing 32. The upper portion of the cylindrical housing 32 is enclosed by member 36 through which rotative motion is translated to the indicator. A six-pole alnico permanent rotor magnet 38 is attached to the output shaft of motor 34. The indicator 24 includes a shaft 40 which extends, axially, with the motor 34 and rotor magnet 38, through a shaft sleeve 42 where it is supported by bearing members 44 and 46. An aluminum eddy current cup or induction member 48 is inverted and attached to the lower end of the indicator shaft 40 which is concentrically positioned about the magnet member 38 by the necessary airgap. Depending upon the motor speed, the permanent magnet member 38 will import angular rotary displacement to the cup member 48 and hence the indicator disc 24 which in turn determines the location of the indicator disc 24 at the off-on and normal mid position relative to the fixed stationary reference member 22.

A spring 50 is coiled around the rotatable sleeve 52 which is a part of the rotary shaft 40. The inner end of the spring is attached to sleeve 52 so as to be rotatable therewith, while the other end is affixed to the stationary bracket 54 which in turn is attached to the housing by bolt 56. A downward stop member 58 is attached beneath the indicator disc 24 so as to be rotatable therewith and within the path of a stop pin 60 which in turn is attached to the bracket 54. The member 58 is wide enough so that the angular rotary displacement of the visual indicator 24 under this arrangement is about 300°, 0° being full-off limit position and 300° being full-on, although the normal operating range would be usually 150°, the midpoint between off-on pointer limits. In the original alignment, the indicator 24 may be positioned about the shaft 40 using setscrew 62. A separate indicator bolt 65 is retained in sleeve 52 by setscrew 64. The sleeve 52 and spring 50 are rotated to place an initial bias or spring force and screw 62 is set to lock sleeve 52 with shaft 40. Upon release the indicator returns to a full-off position or, if adjustment is required by release of setscrew 64, realignment of disc 24 and reset of screw 64 to bolt 65.

Figure 3:
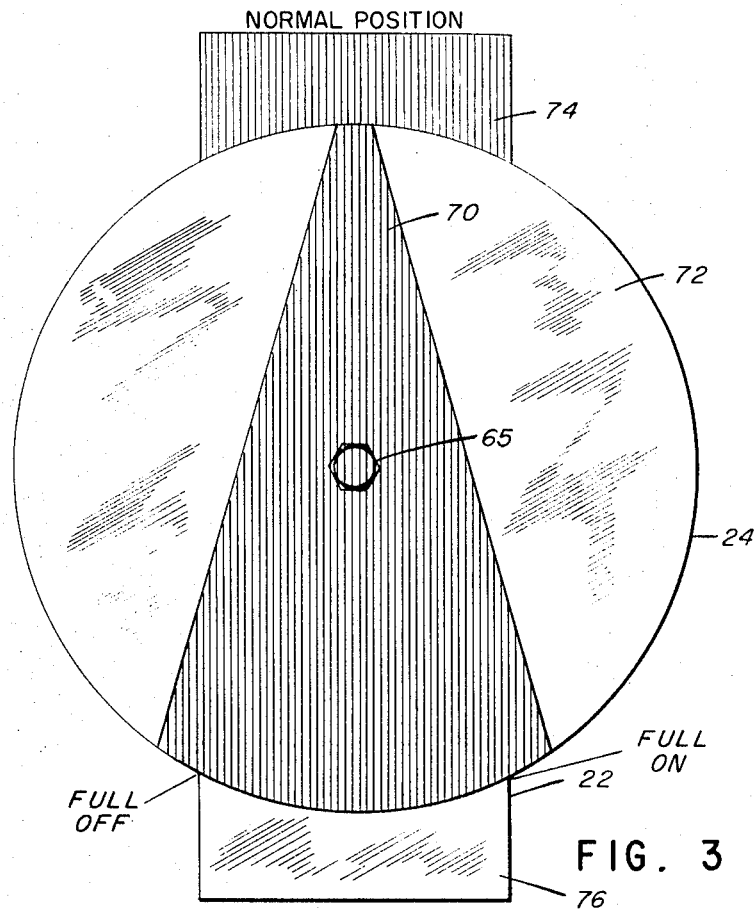
FIG. 3 is a top view of the visual indicator including the movable pointer disc and stationary reference member.

As shown in FIG. 3, the rotary indicator 24, which may be made of lightweight aluminum, may include an identifiable triangular pointer portion 70, as for example red on a white background 72, which rotates relative to the fixed indicator portion 22, which also may be painted with a red portion 74 and white portion 76, so as to provide sufficient contrast viewable from flying aircraft. The midposition of the indicator as shown in FIG. 3 would be sufficient to give an indication of normal or proper operation of the circuitry which is being monitored and measured.

Referring now to FIG. 4, the electrical circuit diagram used in this particular embodiment basically comprises two components, one being the AC monitoring circuit 80 and the AC control circuit 82 which is a portion of the phase control assembly 96. Generally speaking, the circuitry is designed to automatically control the voltage to the motor 34 by the phase control circuitry which provides the correct voltage to the motor to obtain the correct r.p.m. output and hence positioning the indicator 24 relative to the torque of that output. As the speed of the motor changes, torque is transmitted in the form of eddy currents to the aluminum cup by the magnet as a function of the phase control voltage through the airgap to the eddy current cup 48. The amount of eddy current torque developed is opposed by the tension of spring 50 which determines the actual position of the indicator 24 as a function of the r.p.m. of motor 34. A suitable variable power resistor 84 is connected in series with the AC power supply line to the load 86. Although a 220 volt AC power supply is sown herein, it is to be understood that other available input voltages are acceptable. In parallel with the resistor 84 is the series connected signal indicator lamp 88, 100 ohm, four watt, wire-wound potentiometer 90, and signal control lamp 92 which is coupled to a photocell 94 of the control circuit 82 and assembly 96. The signal control lamp and photocell are enclosed in a suitable protective covering to eliminate all external light sources. Hence, only the amount of current flow through resistors 84 and 90 will control the intensity of the indicator lamp 88 and the control lamp 92 which affects the resistance of the photocell 94. The photocell establishes the phase control voltage of the triac subassembly shown within the dotted line, with RFI suppression. This subassembly is a standard extended range variable voltage circuit. Other types of phase control circuitry can be utilized in place of this subassembly, as for example a zero voltage switching circuit.

A constant voltage transformer 100 is connected across the 110 VAC electric power supply to compensate for powerline voltage changes and normal variations in supply voltage affecting the AC phase control triac assembly unit 96 and its associated electrical components. The transformer 100 stabilizes the power supply to reduce the outside voltage influences which would result in an erroneous phase control voltage which might upset the output control speed of the motor 34 and in turn provide erroneous information from the indicator disc 24.

In parallel and across the terminals of the motor 34 is an AC voltmeter 102 which indicates the phase control motor voltage. The range of a standard voltmeter may be used or extended by solid-state arrangements. A typical range of control voltages in between 50 VAC and 75 VAC producing a control range of 25 VAC between full-off and full-on limit positions. The indicator 24 is set for its normal operating position in FIG. 3. At 50 VAC the pointer is at its full-off position. At 67½ VAC the pointer assumes its normal operating midposition. And at 75 VAC the pointer is at its full-on limit position.

The secondary of the content voltage transformer 100 provides isolation from the electric power supply and is connected in series with the triac control circuit assembly 96 and motor 34 with its associated control circuit 82. Because of hysteresis which can occur in the triac assembly 96 resulting from an inductive type load such as the shaded pole motor 34, the RC network of resistor 104 and capacitor 106 is provided.

In the AC control circuit 82 to aid the initial and automatic control of the r.p.m. of the motor 34, two fixed carbon resistors 108 and 110 are used, the former in series with photocell 94 and the latter in parallel therewith. This assists in dampening and reducing the sensitivity of the photocell circuit which triggers the triac control circuit 96.

In operation, the two power resistors 84 and 90 of the AC monitoring circuit 80 are used to set the indicator pointer disc 24 at the normal midpoint position which is predetermined by the DC output load 86 and its relationship to its AC input requirements prescribed by field operating conditions. In addition, these resistors function as sensitivity controls to limit or extend the phase control range as a function of the light intensity of bulb 92. A decrease in load current is indicated by a counterclockwise rotation of the indicator disc 24 and an increase in load by a clockwise rotation. Hence, when an airplane pilot reports the position of indicator 24, the operating personnel, knowing the indicator's calibration for a particular cathodic protection rectifier location, is able to determine the approximate or actual DC amperage of the unit installed at that cite.

Although a DC output load (that to be monitored by visual observation) has been described, monitoring of an AC output system is inclusive of this invention.

I claim:

1. A long distance visual indicator to monitor deviations in a normally constant electrical current unauthorized voltage being supplied to an electrical load condition comprising:

means to monitor said electrical current or voltage being supplied said load, a motor having a magnet attached to its output shaft, a control circuit adapted to receive a signal from said means to monitor, to cause continuous rotation of said magnet at a speed proportional to said monitored signal, an indicator visual at least from an overhead aircraft, said indicator including eddy current induced means adjacent said magnet to receive an emf therefrom, and spring means normally biasing said indicator in one direction whereby torque induced by said eddy currents overcomes said spring bias to provide a movement of said indicator, against said bias, proportionate to said electrical current or voltage being monitored.

2. An indicator according to claim 1 wherein said indicator includes:

a rotatable circular disc with pointer indicia, and a fixed background with indicia to permit visual observation of the relative position of said disc.

3. An indicator according to claim 1 including circuit means to preset and automatically control the rotation of said motor and hence the position of said indicator as a function of a desired range of said electrical current or voltage.

4. A long distance visual indicator to monitor deviations in an electrical signal output from a normally constant electrical load between the range and including full-off and full-on limit positions, and said load being a DC output from a cathodic protection rectifier system, comprising:

AC The means converting said electrical signal into rotation of a magnet at a speed proportional to said signal, said signal adapted by circuitry to control the r.p.m. of said motor; and an indicator visual at least from an overhead aircraft, said indicator including eddy current induced means adjacent said magnet to receive an emf therefrom, and spring means normally biasing said indicator in one direction whereby torque induced by said eddy currents overcomes said spring bias to provide a movement of said indicator against said bias proportionate to said signal.